US007536182B2

(12) United States Patent
Zhang

(10) Patent No.: US 7,536,182 B2
(45) Date of Patent: May 19, 2009

(54) METHOD AND SYSTEM FOR EXTENDING THE CAPABILITIES OF HANDHELD DEVICES USING LOCAL RESOURCES

(75) Inventor: Junbiao Zhang, Highland Park, NJ (US)

(73) Assignee: NEC Corporation, Tokyo (JP)

( * ) Notice: Subject to any disclaimer, the term of this patent is extended or adjusted under 35 U.S.C. 154(b) by 620 days.

(21) Appl. No.: 09/986,698

(22) Filed: Nov. 9, 2001

(65) Prior Publication Data
US 2003/0054794 A1    Mar. 20, 2003

(51) Int. Cl.
*H04M 3/00* (2006.01)
(52) U.S. Cl. .................. 455/420; 455/419; 455/566; 455/457; 455/445; 455/404.2; 342/457.1; 342/825.36
(58) Field of Classification Search .............. 455/553.1, 455/557, 556.1, 414.1, 41.2, 420, 456.3, 455/151.2, 352, 419, 404.2, 99, 3.06, 75, 455/414; 713/168, 229, 201, 202, 200; 709/223
See application file for complete search history.

(56) References Cited
U.S. PATENT DOCUMENTS
6,622,018 B1 * 9/2003 Erekson ...................... 455/420

6,680,923 B1 * 1/2004 Leon ........................... 370/328
2001/0029531 A1 * 10/2001 Ohta ........................... 709/223
2002/0184496 A1 * 12/2002 Mitchell et al. .............. 713/168

FOREIGN PATENT DOCUMENTS
| WO | WO 01/33365 A1 | 5/2001 |
| WO | WO 01/33367 A1 | 5/2001 |
| WO | WO 01/42894 A1 | 6/2001 |

* cited by examiner

*Primary Examiner*—Nick Corsaro
*Assistant Examiner*—Randy Peaches
(74) *Attorney, Agent, or Firm*—Sughrue Mion, PLLC

(57) ABSTRACT

A method and system for extending the capabilities of a handheld device by providing a framework within which small handheld devices can use their helper environment, the devices around them, to expand their limited capabilities. Such a framework can be deployed in the office, at home for user convenience or in a public access area as a revenue generating service. A handheld device interacts with the helper environment through several essential steps including device discovery, service query, request transfer and remote control. In order to ensure the proper operation of such an environment, the framework provides essential system components for admission control, resource allocation, task scheduling and device coordination.

26 Claims, 8 Drawing Sheets

Interface Passing and Construction Feature

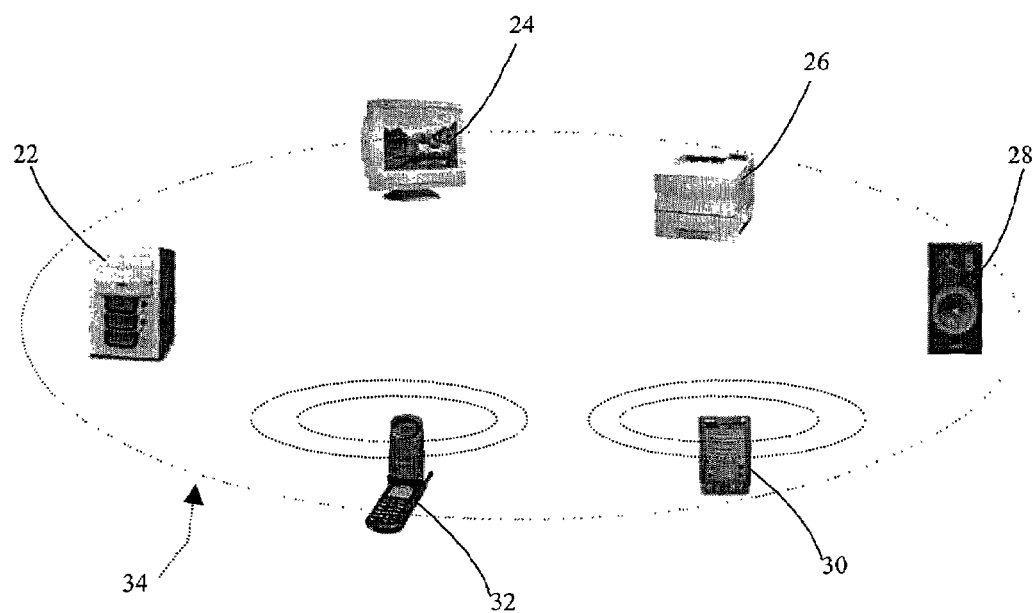
Fig. 1 A Helper Environment

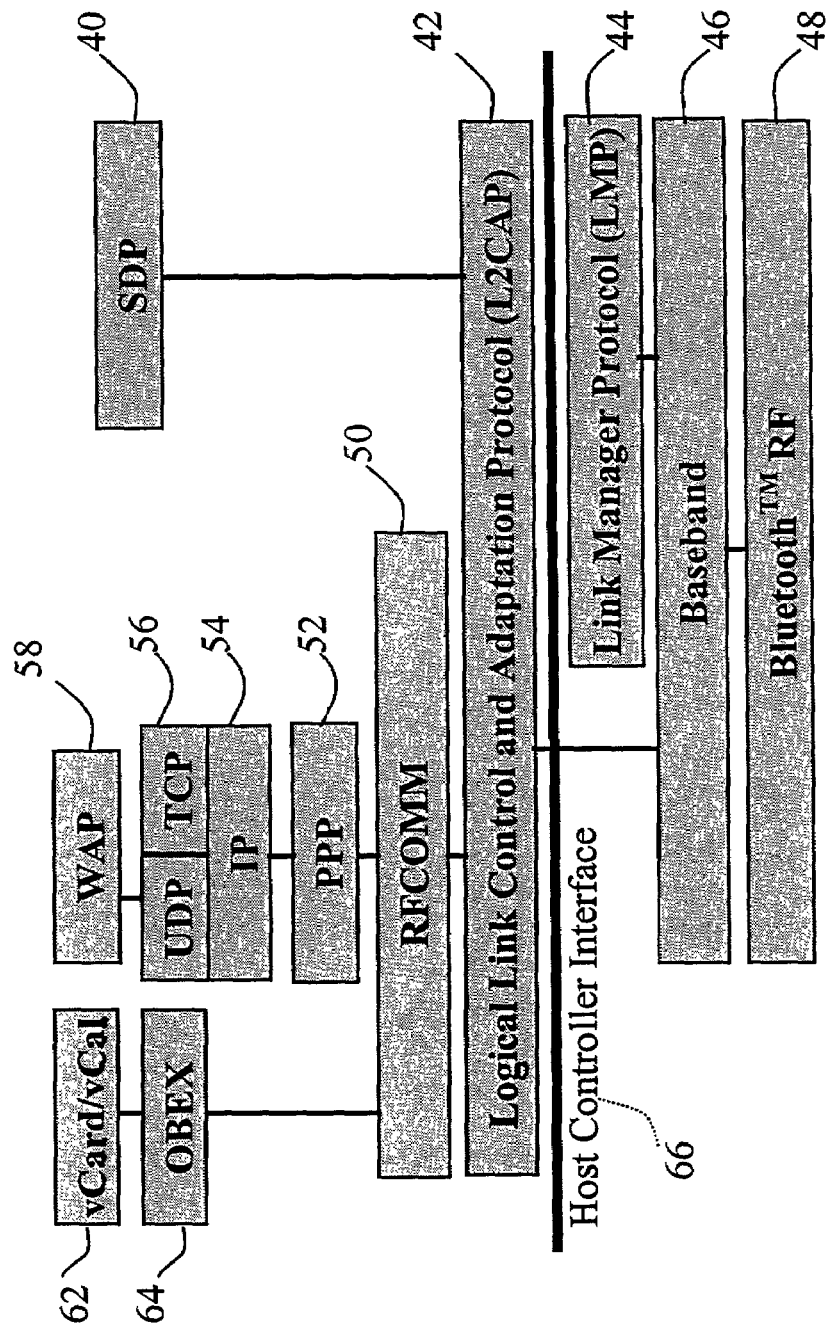
Fig. 2   Bluetooth™ Protocol Stack

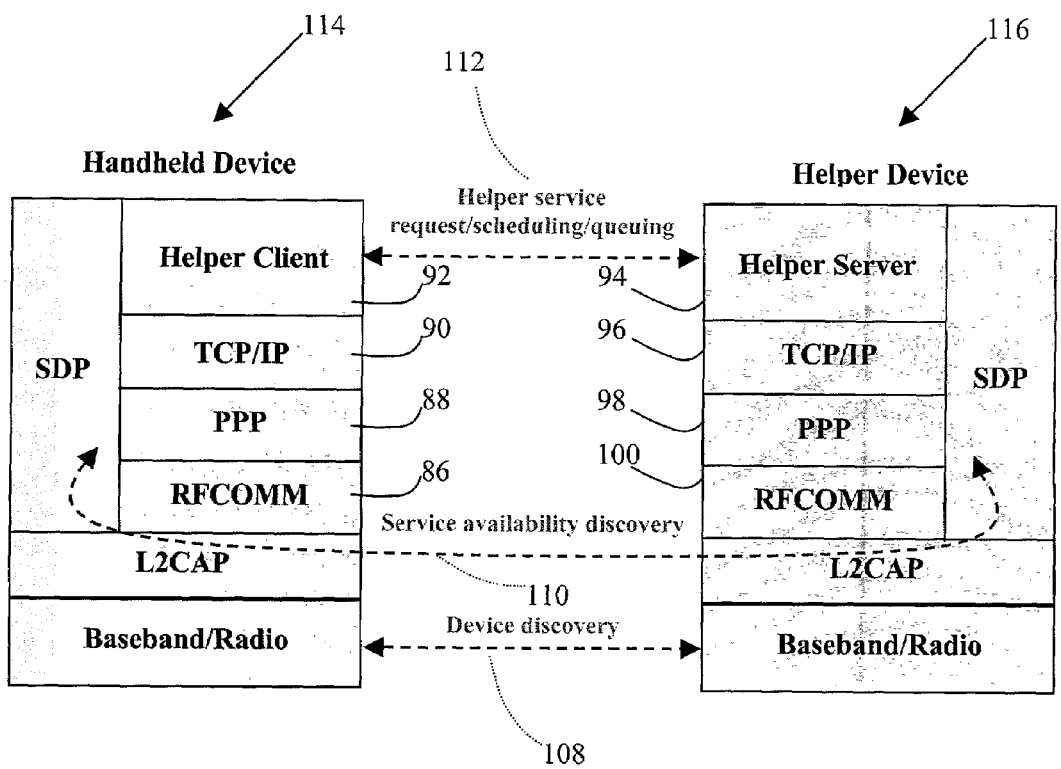
Fig. 3  Helper Environment Protocol Stacks

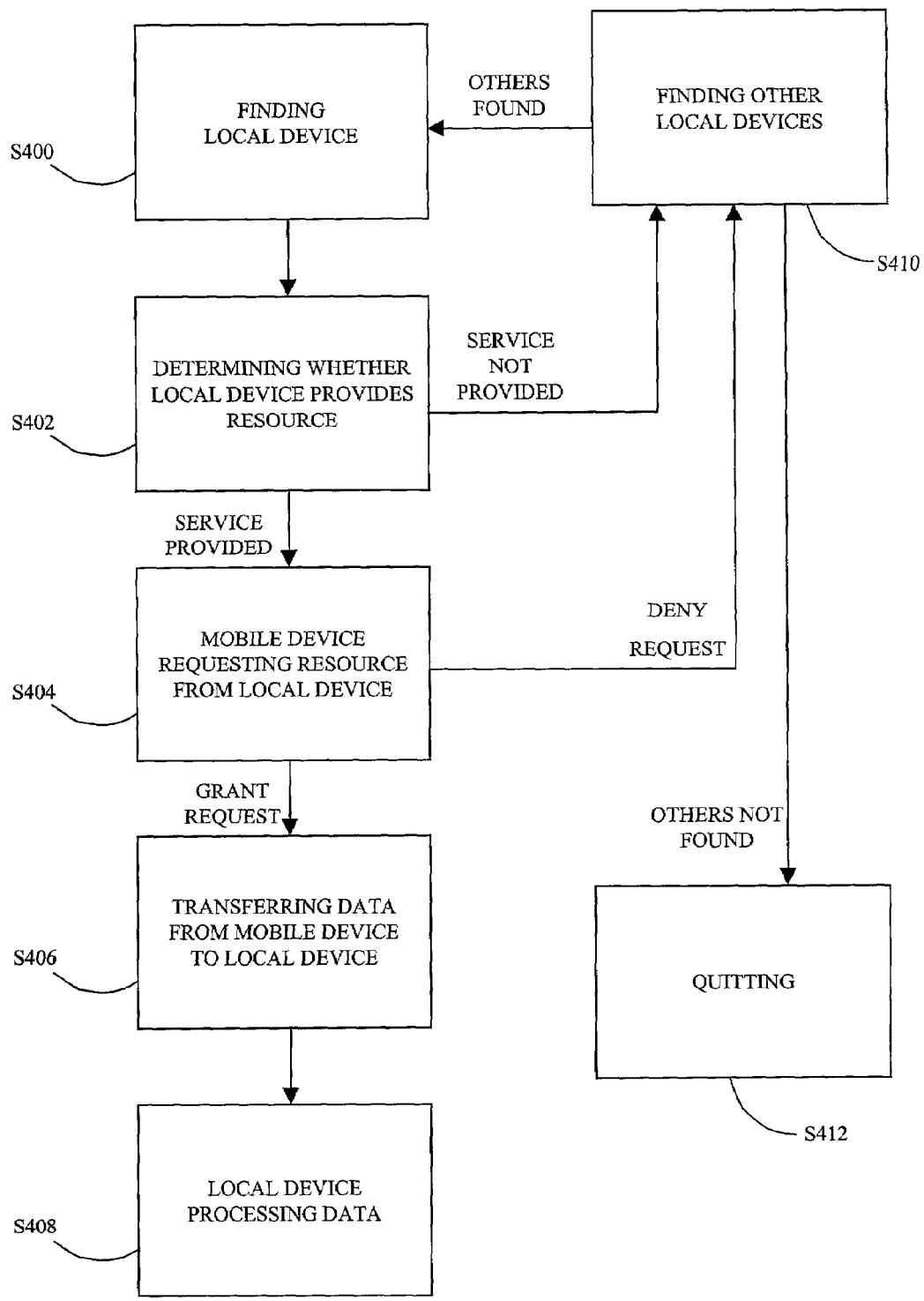
FIG. 4 Remotely Accessing A Resource

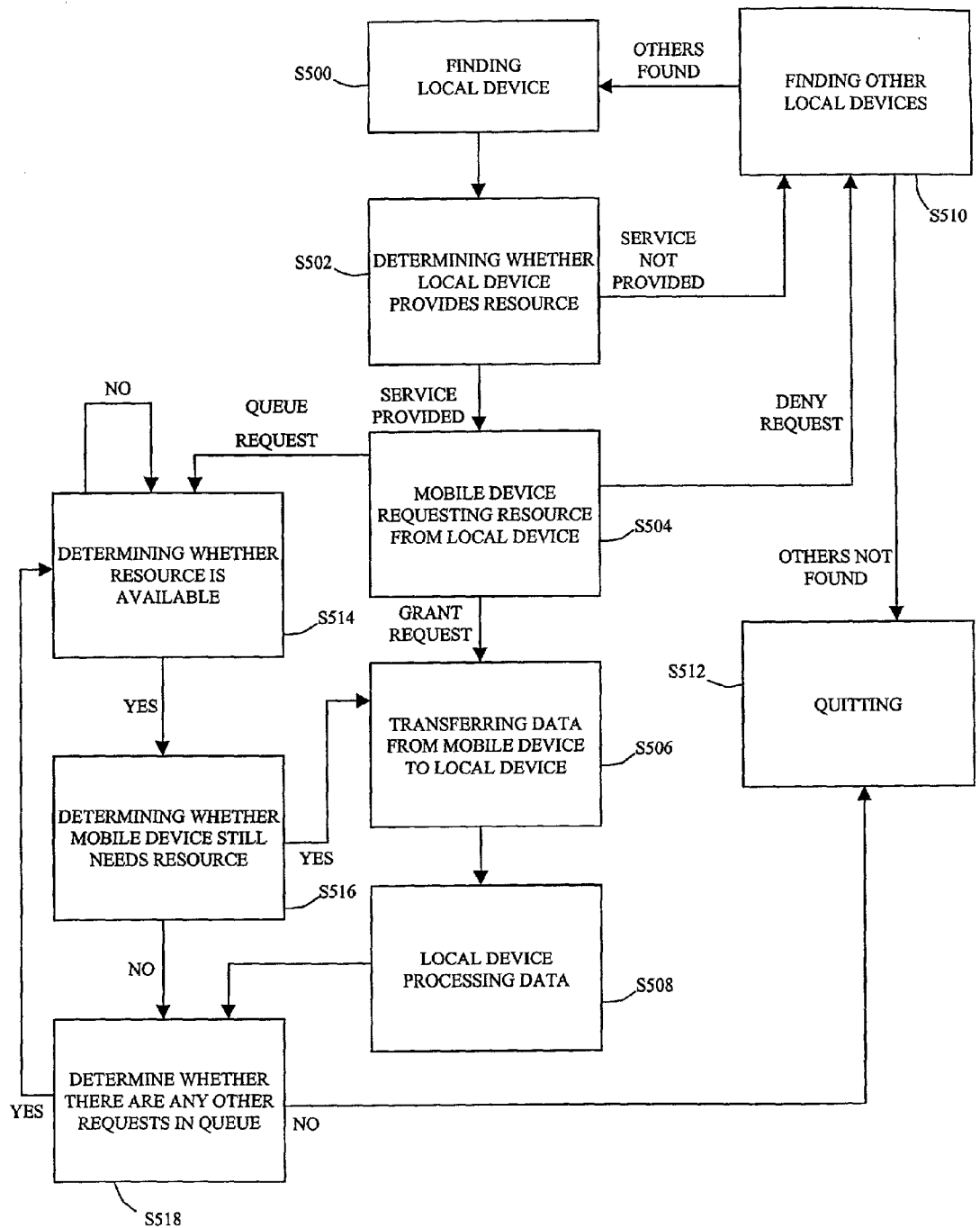
FIG. 5 Remotely Accessing A Resource With Queuing

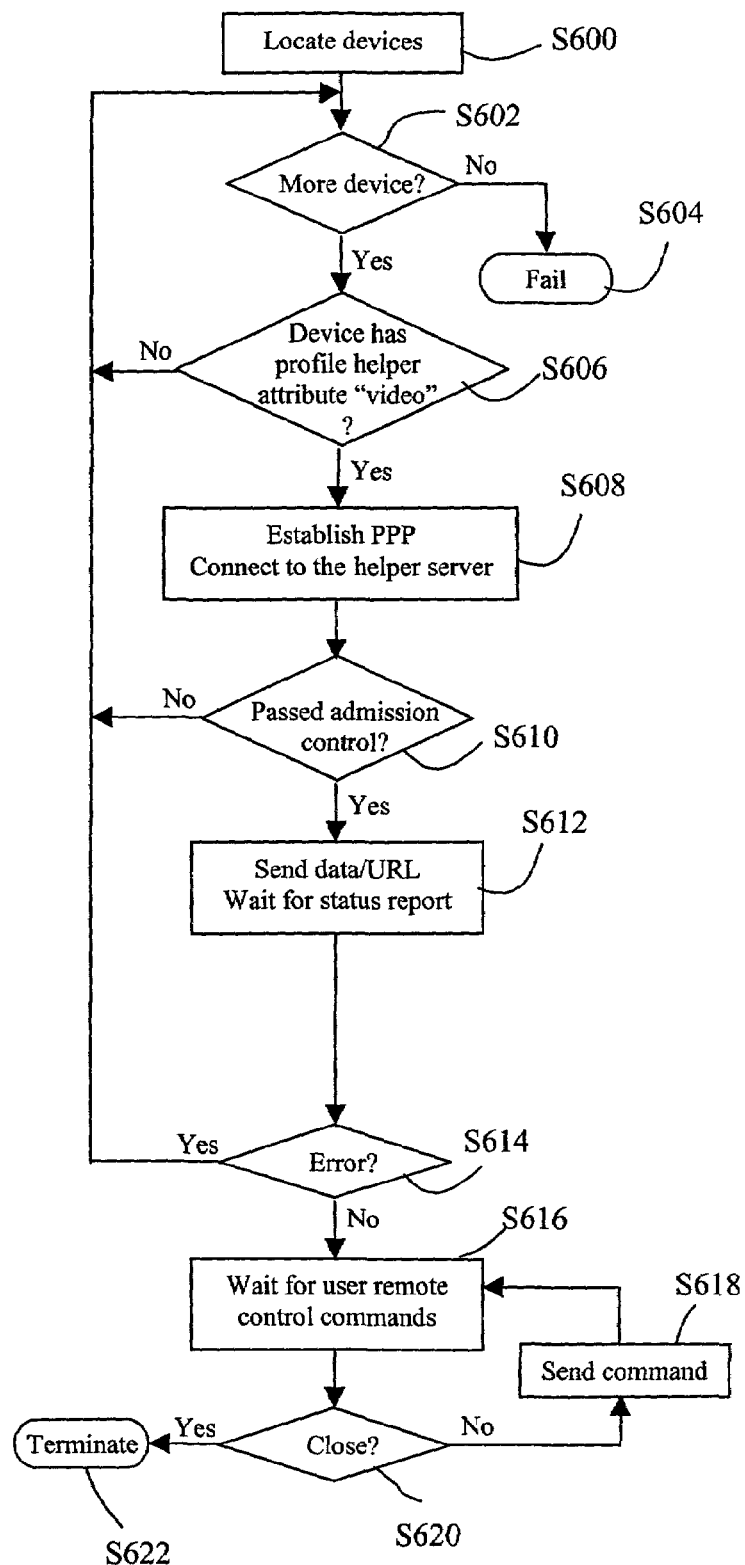
Fig. 6(a) Application Control Flow on a Helper Client

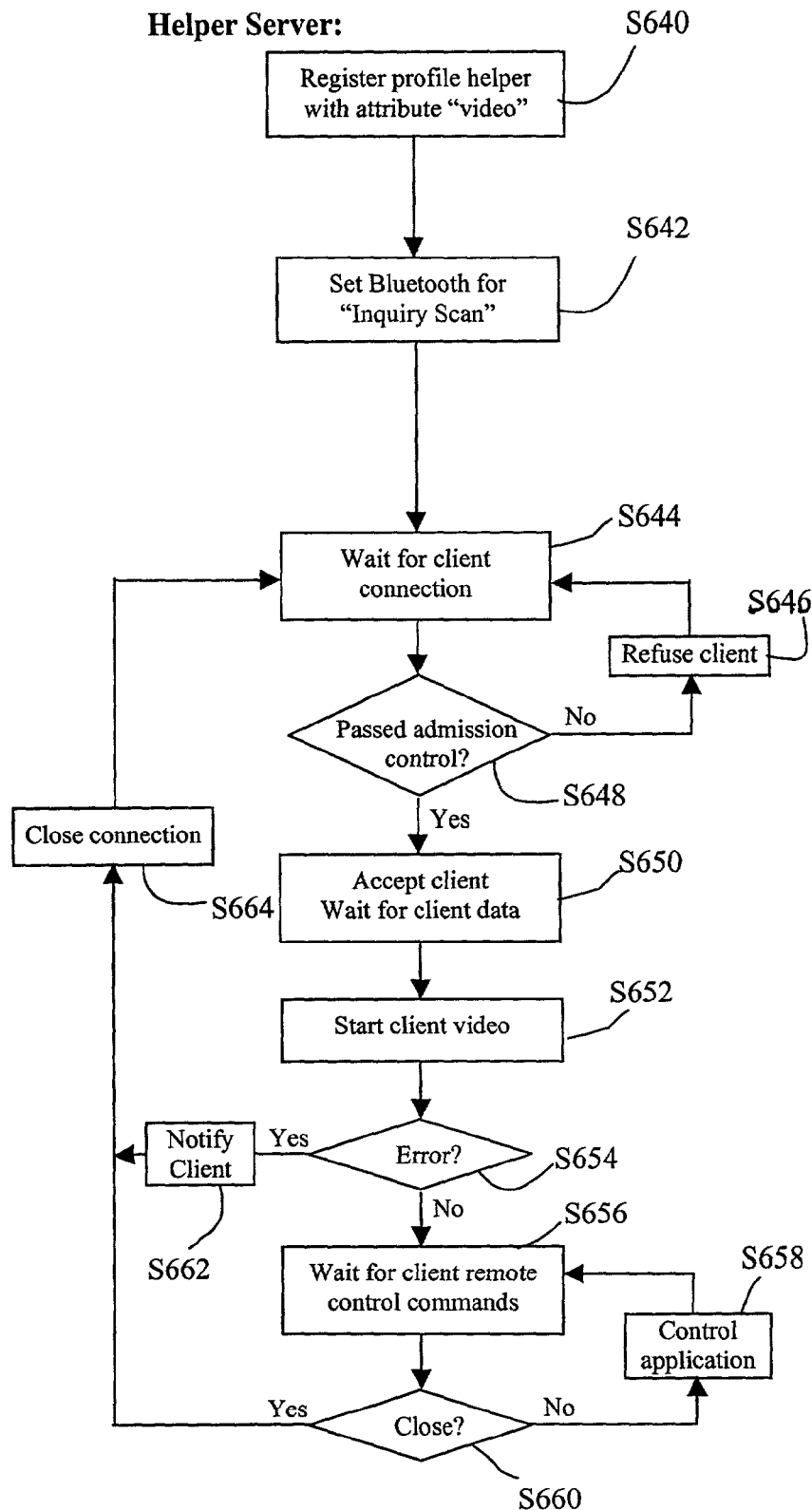
Fig. 6(b) Application Control Flow on a Helper Server

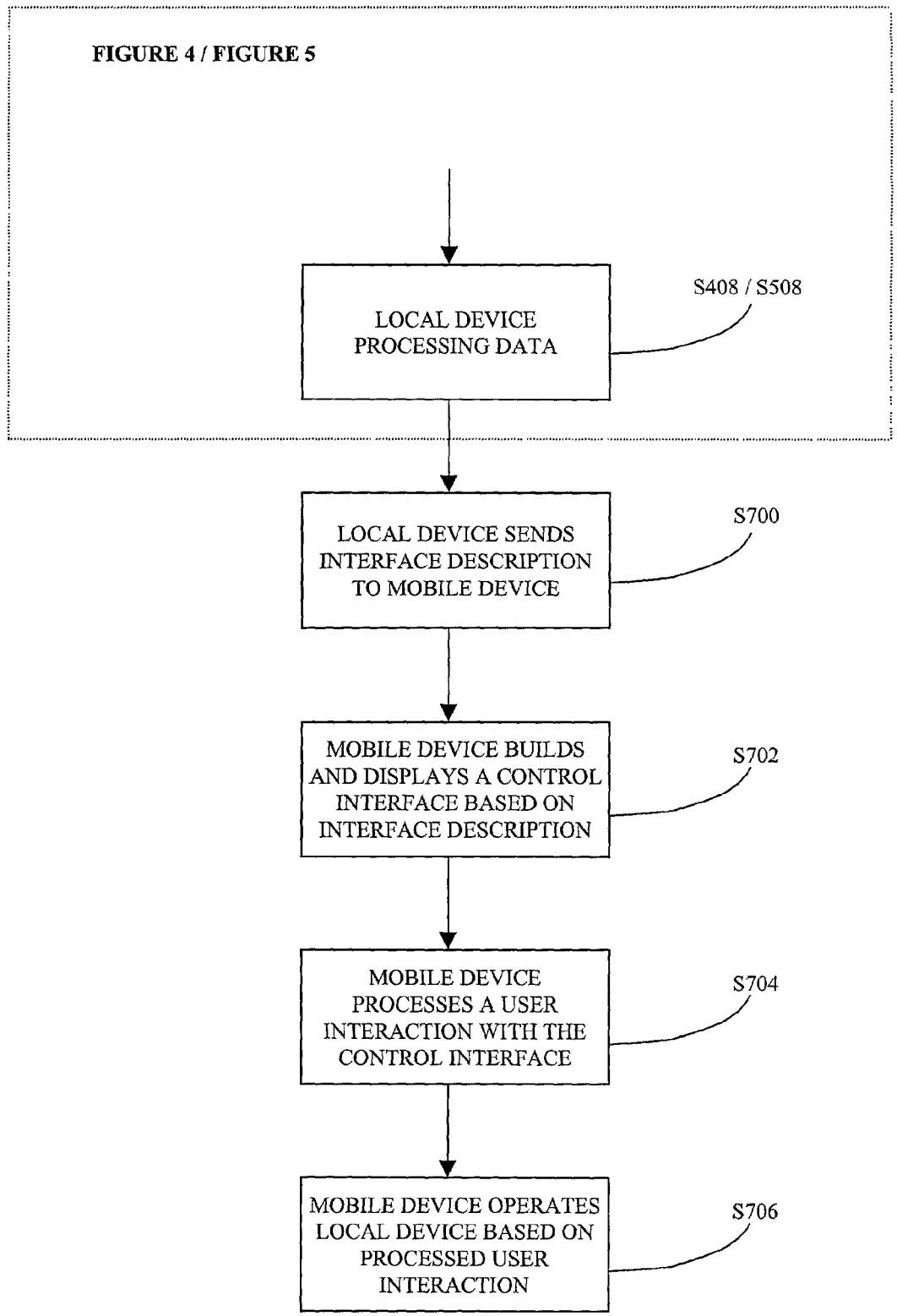
FIG. 7 Interface Passing and Construction Feature

METHOD AND SYSTEM FOR EXTENDING THE CAPABILITIES OF HANDHELD DEVICES USING LOCAL RESOURCES

BACKGROUND OF THE INVENTION

1. Field of the Invention

This invention relates to handheld devices and, more specifically, to a helper environment for extending the capabilities of handheld devices by using nearby devices.

2. Background and Related Art

Digital handheld devices, for example but not by way of limitation, Personal Digital Assistants (PDAs), cell phones, digital cameras and portable MP3 players, have become part of our daily lives. Although each type of handheld device has its own unique characteristics, they generally share common features such as being small in size, being utilized in mobile environments, and containing data processing engines. While these common features make handheld devices very useful and extremely popular, another commonality does not bode well for them: these devices are generally limited in capabilities, especially in terms of screen display, processing power, storage space and network access. Some of these limitations, such as the small screen sizes, are inherently difficult to improve given the usage model of these devices. Often, handheld devices are used near fixed devices that do not suffer from the aforementioned limitations. Accordingly, what is needed in the art is a framework for a handheld device to use the increased capabilities of nearby fixed devices without sacrificing its desirable characteristics such as its small size and mobility.

Some attempts have been made at promoting the interaction between a handheld device and nearby fixed devices. For example, AT&T™ Laboratories developed a teleporting system whereby application interfaces, rather than the computers on which the applications run, are able to move. The teleporting system is implemented using a proxy server. All of a user's applications connect to this proxy server instead of the regular server. This makes it possible for the proxy server to reroute the user input and output to different displays according to the user request. A further enhancement to the teleporting model is to use a digital badge together with sensors in different rooms to identify user locations. User displays can then be automatically rerouted to the display closest to the user.

Subsequently, a more generalized form of teleporting, the Virtual Network Computing (hereinafter "VNC") platform has been developed. It supports cross-platform operation by extending the teleporting system to different windows environments. Both the teleporting model and the VNC platform focus on a remote display system that allows a user to view a computing "desktop" environment not only on the machine where it is running, but from a mobile device as well.

A shortcoming of both the teleporting model and the VNC platform is that they are designed to migrate user interfaces to display devices that have similar capabilities as the original device. Another shortcoming of both the teleporting model and the VNC platform is that they only perform display migration.

The Pebbles project of Carnegie Mellon University represents another attempt at promoting the interaction between a handheld device and nearby fixed devices. The Pebbles project explores the potential of using PDAs as adjuncts to the fixed computers in a networked environment. As part of the project, several applications have been developed. For example, the SlideShow Commander application enables a PDA to serve as a remote control device to manage a presentation from the PDA. Other applications such as remote clipboard and remote mouse can also be used by installing the necessary software packages on both the PDA and the computer.

While the Pebbles project embodies a helper concept, the role of helper is played by the PDAs. The PDAs are used as helpful peripheral devices for the fixed devices. In general, the PDAs in the Pebbles project are used for control purposes. A shortcoming of the Pebbles project is that the addition of a new application requires installing additional software on both the PDA and the fixed devices.

OBJECTS AND BRIEF SUMMARY OF THE INVENTION

It is thus an object and advantage of the invention to provide a framework in which handheld mobile devices can identify and use their environment, the devices around them, to expand their limited capabilities. Such a framework is referred to as a "helper environment", the services provided by the helper environment are referred to as "helper services" or "extension services", and the devices providing these services are referred to as "helper servers". The tasks performed in the helper environment are generally referred to as "extension tasks".

It is another object and advantage of the invention to provide a generic framework that supports a wide variety of capability extensions such as displaying, printing, storing and networking., wherein the handheld devices remain the focus for both control and data.

It is another object and advantage of the invention to provide a generic remote control mechanism wherein a handheld device does not need to maintain a unique or particular remote control interface for each helper service because the helper servers maintain the unique or particular remote control interfaces for the supplied helper services. When using helper services, the handheld device can construct an application specific interface based on an interface description supplied by the helper servers. Also, user interactions with an interface of a handheld device are passed back to the helper servers for interpreting, as opposed to being interpreted by the handheld device. Consequently, the addition or modification of helper services on the helper servers does not require the addition or modification of applications on the handheld device.

It is another object and advantage of the invention to provide a scalable helper environment wherein new helper services can be easily added at the helper servers and existing helper services can be enhanced without affecting the handheld devices.

To achieve the foregoing objectives, the invention is realized in a method for extending the capabilities of handheld devices using nearby fixed devices. The invention also involves a system for implementing the foregoing method.

Further objects and advantages of the invention will become apparent to one skilled in the art from a consideration of the drawings and ensuing description.

BRIEF DESCRIPTION OF THE DRAWING FIGURES

Features and advantages of the present invention will become apparent to those skilled in the art from the following description with reference to the drawings, in which:

FIG. 1 shows a conceptual illustration of a helper environment.

FIG. 2 shows a diagram of the Bluetooth™ protocol stack.

FIG. 3 shows a diagram illustrating helper environment protocol stacks belonging to a helper client and a helper server, as well as various communication paths between the two protocol stacks in an exemplary embodiment.

FIG. 4 shows a flowchart illustrating a method for remotely accessing a resource.

FIG. 5 shows a flowchart illustrating a method for remotely accessing a resource and for the queuing of temporarily unavailable resources.

FIG. 6(a) shows a diagram illustrating the flow control on a handheld device (client) obtaining a helper service from a helper device.

FIG. 6(b) shows a diagram illustrating the flow control on a helper device (server) providing a helper service to a handheld device.

FIG. 7 shows a diagram illustrating the steps for a handheld device to build a control interface based on a description provided by the helper server.

DETAILED DESCRIPTION OF THE PREFERRED EMBODIMENTS

The Invention

Depicted in FIG. 1 is an exemplary helper environment 34 consisting of two mobile devices, a PDA 30 and a cellular phone 32, and four helper servers, a storage device 22, a display device 24, a printing device 26 and an audio device 28, offering helper services. The helper environment 34 provides a framework wherein mobile devices can use the devices around them to extend their limited capabilities.

For example, consider the scenario where the PDA user tries to view some data that the PDA 30 cannot display or can only display in very primitive quality. Within the helper environment 34, the PDA 30 automatically locates a nearby helper server 24 that has a big screen and is capable of displaying the content. It then establishes a connection with the helper server 24 and transfers the content to the helper server 24 for display. Further, the PDA 30 becomes a remote control device to control the display of the content on the helper server 24. In this example, the display capability of the PDA 30 is significantly enhanced through the use of the helper environment 34.

As shown in the above example, the essential steps taken by a handheld device to interact with its helper environment are as follows:

(1) Device discovery: The handheld device identifies the nearby helper servers.

(2) Service query: The handheld device queries the identified helper servers to determine if they are capable of providing the helper service.

(3) Request transfer: The handheld device selects a helper server and delegates the task to it.

(4) Remote control: The helper server returns a remote control interface description to the handheld device. The handheld device builds a Graphical User Interface (GUI) from the interface description and remotely controls the task on the helper server according to user interaction with the handheld device.

FIG. 4 outlines a method that embodies these four essential steps. First, a local device that offers a helper service is found S400. The local device is queried to determine whether it offers the helper service needed by the handheld device S402. If the local device does not offer the needed helper service, the handheld device attempts to locate other local devices that offer services S410 and quits if none are found S412.

If the local device does offer the needed helper service, the handheld device requests the helper service S404. If the local device denies the request, the handheld device attempts to locate other local devices that offer helper services S410 and quits if none are found S412. If the local device grants the request, the handheld device begins transferring data to the local device S406. Finally, the local device operates on the received data S408.

FIG. 5 also outlines a method that embodies these four essential steps, and the method of FIG. 5 additionally supports queuing a request for a service that is temporarily unavailable. First a local device that offers a helper service is found S500. The local device is queried to determine whether it offers the helper service needed by the handheld device S502. If the local device does not offer the needed helper service, the handheld device attempts to locate other local devices that offer services S510 and quits if none are found S512.

If the local device does offer the needed helper service, the handheld device requests the helper service S504. If the local device denies the request, the handheld device attempts to locate other local devices that offer helper services S510 and quits if none are found S512.

If the local device indicates that the helper service is temporarily unavailable, the request is queued S504. When the helper service become available again S514, the local device grants the request provided that the handheld device still needs the service S516. If the handheld device no longer needs the helper service S516, the local device proceeds to process the next request in its queue S518 and quits if its queue is empty S512.

When the local device grants the request, the handheld device begins transferring data to the local device S506. Finally, the local device operates on the received data S508.

The handheld devices represent a means for accessing the helper services. Such mobile devices include, by way of example but not by way of limitation, PDAs, digital cameras, MP3 players and cellular phones. The helper servers control access to the helper services. Such helper servers include, by way of example but not by way of limitation, display devices, print devices, scanning devices, storage devices, network devices, and audio devices. The overall framework of the helper environment concept also requires a means for communicating between these mobile devices and the helper servers in the helper environment.

The framework can be built on top of many different kinds of communication media, for example but not by way of limitation, Bluetooth™ wireless technology, IEEE 802.11 wireless LAN, infrared, HomeRF™, or even wired networks such as Ethernet. Some of these media, such as Bluetooth™ wireless technology, may support link-layer device discovery and service query mechanisms that can be taken advantage of in structuring a helper environment. Because of these advantages, as well as others, an exemplary embodiment will be described using Bluetooth™ wireless technology as the link layer. It should be noted, however, that the overall system framework remains the same across different link-layer protocols.

Bluetooth™ (a registered trademark of Bluetooth SIG, Inc., U.S.A.) wireless technology is a short range radio technology which was primarily designed to replace short cables. It is being standardized by the Bluetooth Special Interest Group. Bluetooth™ devices transmit in the unlicensed 2.4 GHz band and use a frequency hopping spread spectrum technique in 79 hops (23 hops in some countries) displaced by 1 MHz. In power save mode, its range is up to 10 meters and it can provide up to 720 Kbps data rate. Because of its low power consumption and relatively simple technology, chip sets implementing the Bluetooth™ specification are expected to become extremely affordable. Unlike infrared, which requires that devices be aimed at each other (line of sight), Bluetooth™ wireless technology uses omnidirectional radio waves that can transmit through walls and other non-metal barriers. All these make Bluetooth™ wireless technology especially suitable for small mobile devices for ubiquitous connectivity as well as desktop computers for cable replacement.

The Bluetooth™ specification consists of two parts: protocol stack and usage profiles. FIG. 2 illustrates the protocol stack. The Bluetooth™ RF 48, baseband 46 and Link Manager Protocol (LMP) 44 define the physical and link layer protocols, which include radio transmission, device discovery and addressing, as well as link setup and control. Together they provide a host controller interface (HCI) 66 to the higher layer protocols. The Logical Link Control and Adaptation Protocol (L2CAP) 42 supports higher level protocol multiplexing, packet segmentation and reassembly, and the conveying of quality of service information. The RFCOMM protocol 50 emulates the 9 circuits of RS-232 (EIATIA-232-E) serial ports over the L2CAP layer 42. This is where cable replacement mechanisms are provided.

The Service Discovery Protocol (SDP) 40 is also built on top of L2CAP 42 and is used for Bluetooth™ devices to query each other about the services they provide. Services are registered with SDP 40 and put in the Service Discovery Database (SDDB), not pictured, for queries by other devices. The protocol stack includes other high-level protocols such as PPP 50, IP 54, UDP/TCP 56, WAP 58, OBEX 64 and vCard/vCal 62.

Bluetooth™ profiles describe the usage scenarios for applications using Bluetooth™ wireless technology. Each profile explains how the protocol components in the protocol stack are used together to accomplish a certain task. For example, the LAN Access Profile (LAP) defines how a device can establish a PPP connection with a LAN access point.

Some other profiles currently defined by the specification include: Generic Access Profile (GAP) defines the generic procedures of device discovery and link management, and provides the basis for all other profiles; Service Discovery Application Profile (SDAP) defines the general service discovery procedures; Serial Port Profile (SPP) defines the requirements for setting up emulated serial cable connections; The Generic Object Exchange Profile (GOEP) defines the procedures for synchronization, file transfer, or Object Push model; Object Push Profile (OPP) defines the requirements for pushing/pulling of data objects between Bluetooth™ devices; File Transfer Profile (FTP) defines the requirements for applications providing the file transfer usage model, and Synchronization Profile (SP) defines the requirements for applications providing data synchronization. In the exemplary embodiment, the helper environment is built as a new Bluetooth™ profile. It will rely on the protocol stack as well as some of the profiles, in particular SDAP and the LAP profiles, for convenience.

A typical helper environment consists of a number of helper servers that accept requests and provide helper services to clients within operating range of the communication media. In order to ensure the proper operation of the helper environment, protocol stacks at the clients and servers must be defined for the interactions among the clients and the servers.

The framework can, by way of example but not by way of limitation, be built on top of TCP/IP. This requires the mobile device to establish a PPP connection over the RFCOMM link (serial cable emulation) with the helper device. Although for some of the applications, simpler protocols such as OBEX are sufficient, an IP based solution is preferred because it is more generic and thus easier to accommodate new applications such as network access.

In FIG. 3, the helper client 92 is a process running on the handheld device 114. It may run as a daemon or be activated on demand. It operates with TCP/IP 90 over the PPP protocol stack 88. The helper client 92, which is similar in nature to a Remote Procedure Call (RPC) client stub, maintains an "environment capability" table through Bluetooth™ wireless technology inquiries 108 and service discovery 110. The table is refreshed periodically or on demand by the use of the handheld device 114. The helper client 92, also handles all helper requests 112 on the handheld device 114 by forwarding them to a selected helper server 94, notifies the user about service availability for queued requests, translates user interactions into remote control commands and sends them to the helper server 94, and terminates the helper session based on user request.

The helper server 94 is a separate process running on the helper device 116. It operates with TCP/IP 96 over the PPP protocol stack 98. The helper server 94, which is similar in nature to a Remote Procedure Call (RPC) server stub, registers with the Bluetooth™ service discovery database (SDDB) about its existence and capabilities. The helper server 94, also handles admission control, requests queuing 112 and client notification, accepts client requests and displays client data, returns a remote control interface description to client, communicates with the client through a helper protocol for data/Uniform Resource Locator (URL) transfer and remote control interaction exchange, and terminates the session based on a client request.

FIGS. 6(a) and 6(b) illustrate the control flow on both a handheld device and a helper device within the exemplary embodiment of the helper environment. Before a handheld device attempts to start an extension task, it must first determine whether there is a helper device in its environment that can fulfill the requested task. To achieve this, three steps are actually involved: (1) locating nearby devices, (2) querying these devices about the existence of requested helper services and (3) determining whether the helper device can service the request at the moment.

Steps 2 and 3 are separated because the Bluetooth™ service discovery database can only contain records about service availability. More complicated service admission controls and service queuing can only be done at the application layer. The Bluetooth™ Service Discovery Application Profile contains the procedure for carrying out the first two steps.

First, the helper client initiates the device discovery process by instructing Bluetooth™ baseband to enter the inquiry state. All devices in the environment willing to provide helper services are supposed to be waiting for a connection S644 in the inquiry scan state and respond to the device inquiry S642. The handheld device can thus identify the devices in its environment and learn the addresses of these devices S600. It then attempts the paging process on each of these devices to establish a link layer connection. After a connection is set up, it initiates a service inquiry to the connected device to determine whether the device provides the requested helper service S606. The helper framework should have a corresponding profile and be assigned a unique profile id, while each specific helper service is identified by a corresponding attribute in the profile S640. Each helper server should update the Service Discovery Database (SDDB) with the helper profile id and the attribute reflecting its provided services.

Once devices with requested helper services are located, the handheld device can initiate the LAN Access Profile and establish a PPP connection with the helper device S608. With the PPP connection in place, the helper client can then connect to the helper server through TCP and send its service request. The request may contain the following information for the server admission control: the MIME type of the user data, the requested service on the data (e.g. displaying, printing or storing), a flag indicating whether the actual data or a URL will follow, the length of the data in bytes, the expected duration of the service, and optionally, authentication information.

Client data can be either actual data or a URL to the data. It is envisioned that URLs will be used frequently in a networked environment. Use of URLs is much more efficient and faster since mobile devices do not have to retrieve data and then send to the helper device. For handheld devices such as Wireless Application Protocol (WAP) phones that only has very small memory size, URLs can be the only way to display the data.

The server makes the admission decision S648 and informs the client whether its service request can be granted right away, has to be queued or is denied (e.g. not enough total resource on the server or authentication failure) S646. As illustrated in FIG. 5, when the request has to be queued, the client will be notified at a later point when the service becomes available S514. To handle this case, a client may contact multiple servers. As soon as one of the servers starts servicing the request, the client informs the other queuing servers, if any, to remove the identical service request from their queues.

After a client request is put on a service queue, it is not feasible for the client to maintain the PPP connection with the server since it is likely that the client may submit multiple requests to different helpers. Maintaining so many PPP connections may consume a lot of power on the mobile device. Instead, once the client request is put on a server queue, the PPP connection between the client and the server can be torn down. Since the client information including its Bluetooth™ address id is stored in the server queue, the server can initiate a paging process once the client request can be serviced. All the client has to do is to wait in the paging scan mode. As soon as a server starts paging a client, it will pick up the paging signal and reestablish the PPP session with the server.

Once the client obtains the requested service, it can simply ignore the paging from other servers. For these servers, failed paging would mean that the client is either no longer interested in the services or has moved out of range. They can then start serving the next requests in their queues. Note that it is possible for the client to notify all the other servers once it obtains the requested service from a server. To do this, it has to page each of these servers, establish a PPP connection and informs the server. Such a scheme is less preferred because it is much more processing intensive than the server paging mechanism.

Once a service request is accepted by a helper server S650, the client is notified S610 and can start transferring service data to the server S612. If the client fails to transfer the service data S614, the handheld device attempts to identify another device in its environment S602 and S604. Upon receiving the header and the data, the helper server starts the proper applications to operate on the data as requested S652. If an error is encountered during the operation of the helper server on the data S654, the client is notified S662 and the connection is closed S664. The client can then take actions based on the error information. For example, if the error indicates that the data is corrupt and cannot be displayed, the client should close the connection.

Not shown in FIGS. 6(a) and 6(b) is the transition for the abnormal condition when the TCP connection between the client and the server is broken. This could happen at any step after connection is established and is most probably due to the client moving out of communication range of the server. One way to handle this abnormal condition is to have the client go back to the "locate devices" step S600 while the server returns to the "wait for client connection" step S644.

In the case when the user data is displayed on the helper device, the user can use the handheld device and the Bluetooth™ connection to remotely control the display of the data S616, S618, S620 and S622. For example, for streaming data, the user may issue "stop", "resume" and "fast forward" commands to the server. For various types of documents, the user may send "page up" and "page down" commands. Because of the application specific nature of the remote controls, the handheld device and the helper device must coordinate with each other to carry out the control. Because of the diverse nature of the helper services, it is preferred that the client devices do not store the remote control interface for each service application. Doing so would also makes the addition of new services and the enhancement of existing services very difficult, since they would require the modification on the handheld devices.

As show in FIG. 7, the preferred approach is to let the server pass the application specific control interface to the client S700 after the server has begun operating on the received data at step S408 of FIG. 4 or step S508 of FIG. 5. This approach insures that the client need not store the specific interface for each service application. The interface description sent from the server to the client can be specified in a generic markup language, for example but not by way of limitation, XML or HTML. The description contains graphical interface representations such as buttons and menus as well as user interactions such as sending a "page down" message if a specific button is pressed. The client device then interprets the description and displays the user interface S702. User interactions with the interface S704 are not interpreted by the handheld device but are instead passed back to the server which interprets them according to the specific application S706. For further customization, the client can inform the server about the device capability when issuing the service request. This would enable the server, for example, to return a graphical interface or a text-based interface.

To better illustrate this approach, consider a video display application on a helper server as in FIG. 6(b). After the server starts the application S652, it passes back to the client of FIG. 6(a) an interface according to the client device type. For example, if the client device is a PDA, a simple graphical interface with control buttons such as "play", "pause" and "fast forward". If the client device is a simple WAP phone, the server may return a WML page with links marked by control commands (e.g. "play" and "pause"). Activating one of these links S616, S618 and S620 will result in the server receiving the control command and subsequently taking proper actions S656, 658 and 660.

Because the application specific interfaces are stored on the helper servers and not the handheld device, because the handheld device constructs an application specific interface based on an interface description provided by the helper servers, and because the interpretation of user interactions with the constructed interface occurs on the helper servers, new helper services can be added or existing helper services can be modified without requiring modifications on the handheld device.

The helper environment is an expansion of the capabilities of a handheld device, i.e. it is invoked when existing applications on the handheld device cannot adequately handle certain data content. Therefore, in most cases, it is not necessary to modify the existing applications for the integration of helper support into the handheld device. Helper-aware applications will coexist with legacy applications on the handheld device. Some applications, most notably web browsing tools, need modification in order to take advantage of the helper services. An examination of how the helper mechanism can be integrated into these different tools on different OS platforms illustrates that the helper environment can be implemented under various operating systems.

For example, but not by way of limitation, helper integration into platforms running Windows CE™ is relatively easy. Windows CE™ keeps the file concept and maintains association between file types and their corresponding applications. To support a type of file that requires the helper environment, an association between the file type and the helper client can be established. This association is not only valid for web browsing, but applies to the whole Windows CE™ environment.

In contrast, it is difficult in Palm OS™ to provide the kind of seamless helper integration described above since Palm OS™ does not have file systems. As an example and not by way of limitation, consider an approach to integrating the helper concept into web browsing which is supported through a query application and web clipping. Related, static content in an HTML page is compiled into an application (referred to as a Palm™ Query Application in Palm OS™) which is then installed on a Palm™ device. The equivalence of a URL inside the application may point to data within the application, in which case the link can be immediately retrieved. For links outside of the application, a proxy server is used to convert regular web content into Palm™ Query Appliaction displayable format, a process referred to as web clipping. Web clipping may result in content (e.g. Java Applets) being filtered out. In order to integrate helper services, the application compiler needs to be modified so that certain type of content will be handled through the helper client procedure. On the proxy server, web clipping needs to take into consideration whether the application on the Palm™ device has helper capability when making filtering and conversion.

Finally, helper integration into WAP is similar to the case of Palm™ Query Application. The WAP browser needs to be enhanced with helper client functionality to support more complex types.

TCP provides a preferred protocol for connections between helper clients and helper servers for as least the following three reasons:

(1) For each extension task, a session needs to be maintained. It starts from the time the client request is accepted by the server and ends when the user finishes using the helper service. During the session, both data and control information are exchanged. Because of the simple helper model, each session naturally corresponds to the TCP connection between the client and the server.

(2) TCP provides a sequential and reliable transport channel between the client and the server. This is particularly important for command transfer, i.e. clients need to make sure that commands are transferred to the server reliably and in the same order as issued by the user.

(3) Because of the mobile nature of the client, both the client and the server need to constantly make sure that they are still within the range for communication. TCP connection break-up will automatically inform the client and the server about the out-of-range (and thus out-of-service) condition.

Nonetheless, the invention is not limited to using TCP. For example, in another embodiment using UDP, a keep-alive UDP message has to be exchanged between the client and the server periodically.

Maintaining security is also an important aspect of the helper environment framework. Because the helper service is fully controlled by the helper servers, the mobile clients will not be able to compromise the security on the servers. Any helper request must pass admission control and can only access a controlled set of services provided by the server. The remote control interface is also provided by the server and the control commands are interpreted by the server. Further, the main purpose of the helper environment is to help process and display data. Thus the client cannot run arbitrary programs on the server, but rather can invoke existing programs on the server with client data.

Another aspect of security is client authentication and billing. For a public helper environment, a pay-per-use scheme would be very inconvenient for the users and would greatly limit the usefulness of the environment. In our exemplary embodiment using Bluetooth™ wireless technology, authentication and security can be achieved through the installation of a common pin at two communicating devices. If every time a mobile client uses a helper service, the common pin has to be first installed (either manually, or through a complex mutual authentication process with a third party), very few users would want to use the helper services.

To alleviate this problem, an embodiment of the helper environment framework adopts an "authenticate once, use many times" scheme. When a user decides to use the helper environments in a public facility, he can authenticate with any of the helper environments using manual pin configuration (e.g. similar to the calling card mechanism, purchasing a user id and a pin number) or a complex mutual authentication process using a third party. The result of the authentication is that the user obtains a unique id and a pin that can be used in the helper environments in the facility.

A central database in the facility is used to store the user ids and their corresponding pin numbers. When the user starts using a different helper environment, it tries to establish connections with potential helper devices. It first tells the device his user id. The device then uses this id to fetch the pin from the database and set up the pin on the server. A secure link can then be established between the server and the user device.

As a final consideration for the above embodiments, the mobility of a mobile user is maintained within the helper environment. Both nomadic and seamless mobility are contemplated. In the embodiment with nomadic mobility, the typical usage scenario is as follows: the mobile user moves into a helper environment and starts a service on a helper server. When the user moves and decides to change server, the current service session is first terminated before a new session is started at another helper server within range. There will be no continuity between these two service sessions.

In an alternative embodiment supporting seamless mobility, state information is retained when the user moves causing a change in servers. This state information is passed to the new helper server so that it can resume providing the helper service to the data indicated in the saved state information. This seamless mobility will be particularly useful, for example, in a streaming situation in which video streams may move from one helper to another with display continuity.

The present invention may be embodied in other specific forms without departing from its spirit or essential character- There is claimed:

1. A method for extending a capability of a handheld device capable of independent operation, the method comprising:
   detecting a helper device that provides a resource;
   requesting access to the resource from the helper device;
   transferring data to the helper device from the handheld device, if the helper device grants access to the resource;
   using the resource to process the data transferred from the handheld device at the helper device;
   sending an interface description from the helper device to the handheld device;
   using the interface description to construct and display a control interface at the handheld device;
   transferring a user interaction with the control interface from the handheld device to the helper device, and
   interpreting the user interaction based on the resource;
   wherein the resource is not adequately provided by the independent operation of the handheld device
   wherein if the helper device denies access to the resource, detecting another helper device that provides the resource
   wherein the handheld device operates the helper device based on the user interaction, and
   wherein adding a new resource or modifying an existing resource does not require modifying the handheld device.

2. The method of claim 1, wherein using the resource to process the data transferred from the handheld device is controlled by the handheld device.

3. The method of claim 1, further comprising sending a status report of the operation of the resource on the data from the helper device to the handheld device,
   wherein the handheld device performs an action based on the status report.

4. A method for extending a capability of a handheld device capable of independent operation, the method comprising:
   detecting a plurality of helper devices, each helper device providing at least one resource and controlling access to the resource;
   determining the helper devices that provide a first resource needed to extend the capability of the handheld device;
   issuing a request for access to the first resource to each of the helper devices providing the first resource, each of the helper devices providing the first resource queuing the request if the first resource is temporarily unavailable, wherein when the first resource becomes available to a first helper device having queued the request, the first helper device grants the handheld device access to the first resource and any requests for the first resource queued in the other helper devices are ignored;
   transferring data to the first helper device from the handheld device, if the first helper device grants access to the first resource;
   using the first resource to process the data transferred from the handheld device at the first helper device;
   sending an interface description from the first helper device to the handheld device;
   constructing and displaying a control interface from the interface description at the handheld device;
   processing a user interaction with the control interface at the handheld device, and
   operating the first helper device based on the user interaction,
   wherein the first resource is not adequately provided by the independent operation of the handheld device,
   wherein if a communication between the handheld device and the first helper device is broken before the handheld device has completed use of the first resource, detecting another helper device providing the first resource.

5. The method of claim 4, further comprising controlling the processing of the data, transferred from the handheld device to the first helper device, by the handheld device.

6. The method of claim 4, further comprising:
   sending a status report of the processing of the data using the first resource, from the first helper device to the handheld device, and
   performing an action by the handheld device based on the status report.

7. A system for extending a capability of a mobile device, the system comprising:
   a handheld device capable of independent operation; and
   a plurality of helper devices, each helper device providing an extension service and controlling access to the at least one extension service;
   wherein the handheld device communicates with each of the helper devices to determine if any of the helper devices is capable of providing a selected extension service to the handheld device;
   wherein the handheld device issues a request for the selected extension service to each of the helper devices providing the selected extension service, and each of the helper devices providing the selected extension service queue the request if the selected extension service is temporarily unavailable;
   wherein when the selected extension service becomes available to a first helper device having queued the request, the first helper device grants the handheld device access to the selected extension service, and all other queued requests for the selected extension service, in other helper devices, are ignored;
   wherein if each of the helper devices providing the selected extension service denies the handheld device access to the selected extension service, the handheld device terminates communication with each of the helper devices providing the selected extension service;
   wherein the handheld device transfers data to the first helper device, if the first helper device grants access to the selected extension service;
   wherein the first helper device uses the selected extension service to process the data transferred from the handheld device to the first helper device;
   wherein the first helper device sends an interface description to the handheld device;
   wherein the handheld device constructs and displays a control interface using the interface description;
   wherein the handheld device transfers a user interaction with the control interface to the first helper device,
   wherein the first helper device interprets the user interaction based on the selected extension service;
   wherein the handheld device operates the first helper device based on the user interaction, and
   wherein the selected extension service is not adequately provided by the independent operation of the handheld device, and
   wherein a new extension service can be added or an existing extension service can be modified without modifying the handheld device
   wherein if a communication between the handheld device and the first helper device is broken before the handheld device has completed use of the selected extension service, another helper device providing the selected extension service is detected.

8. The system of claim 7, wherein the operation of the selected extension service on the data is controlled by the handheld device.

9. The system of claim 7, wherein the interface description is specified in a markup language.

10. The system of claim 7, further comprising a storage device which stores service information for the extension service provided by each of the helper devices.

11. The system of claim 7, further comprising an access database which stores authentication data associated with the handheld device,
wherein each of the helper devices providing the selected extension service control access to the selected extension service using the authentication data.

12. The system of claim 7, wherein the data transferred from the handheld device consists of a URL.

13. The system of claim 7, wherein the data transferred from the handheld device comprises a URL.

14. The system of claim 7, wherein the handheld device includes a client for communicating with each of the helper devices, the client being activated on demand.

15. The system of claim 7, wherein the handheld device includes a client for communicating with each of the helper devices, the client running as a daemon.

16. The system of claim 7, wherein the first helper device sends a status report of the operation of the selected extension service on the data to the handheld device, and the handheld device performs an action based on the status report.

17. A system for extending a capability of a handheld device capable of independent operation, the system comprising:
first means in the handheld device for accessing a resource of a local device;
second means in the local device for controlling access to the resource; and
third means in at least one of the handheld device and the local device for communicating between the first means and the second means;
wherein the first means uses the third means to determine if the second means is capable of providing the resource to the first means;
wherein the first means uses the third means to issue a request for the resource from the second means, the second means queuing the request if the resource is temporarily unavailable;
wherein if the resource becomes available to the second means, the second means grants the first means access to the resource, and any other queued requests for the resource issued by the first means to other local devices are ignored;
wherein the first means uses the third means to transfer data to the second means, if the second means grants the first means access to the resource;
wherein the second means uses the resource to process the data;
wherein the second means uses the third means to send an interface description to the first means;
wherein the first means constructs and displays a control interface using the interface description;
wherein the first means uses the third means to transfer a user interaction with the control interface to the second means;
wherein the second means interprets the user interaction based on the resource;
wherein the first means uses the third means to operate the second means based on the user interaction; and
wherein the resource is not adequately provided by the independent operation of the first means
wherein if access to the resource is denied another device that provides the access is detected.

18. The system of claim 17, wherein the operation of the resource on the data is controlled by the first means using the third means.

19. The system of claim 17, wherein the interface description is specified in a markup language.

20. The system of claim 17, wherein the request for the resource includes capability information associated with the first means, and
wherein the capability information is used by the second means to determine the appropriate interface description to send to the first means.

21. The system of claim 17, wherein the request for the resource from the first means includes the type of the data to be transferred and the size of the data.

22. The system of claim 17, wherein the data transferred from the first means consists of a URL.

23. The system of claim 17, wherein the data transferred from the first means comprises a URL.

24. The system of claim 17, wherein the first means includes a client for accessing the resource, the client being activated on demand.

25. The system of claim 17, wherein the first means includes a client for accessing the resource, the client running as a daemon.

26. The system of claim 17, wherein the second means uses the third means to send a status report of the operation of the resource on the data to the first means, and the first means performs an action based on the status report.

* * * * *